United States Patent [19]

Lappos et al.

[11] Patent Number: 4,736,331
[45] Date of Patent: Apr. 5, 1988

[54] HELICOPTER POWER AVAILABLE TO HOVER INDICATOR

[75] Inventors: Nicholas D. Lappos, Madison; Raymond D. Zagranski, Somers; James J. Howlett, North Haven, all of Conn.

[73] Assignee: United Technologies Corporation, Hartford, Conn.

[21] Appl. No.: 827,221

[22] Filed: Feb. 5, 1986

Related U.S. Application Data

[63] Continuation of Ser. No. 382,257, May 26, 1982, abandoned.

[51] Int. Cl.⁴ .............................................. G01C 23/00
[52] U.S. Cl. .................................. 364/551; 73/178 H
[58] Field of Search ............. 364/550, 551; 73/178 H, 73/117.3

[56] References Cited

U.S. PATENT DOCUMENTS

| | | | |
|---|---|---|---|
| 3,181,353 | 5/1965 | Brahm et al. | 73/117.3 |
| 3,272,004 | 9/1966 | Haverl | 364/551 |
| 3,287,965 | 11/1966 | Brahm et al. | 364/551 |
| 3,616,691 | 11/1971 | Brandau | 73/178 H |
| 3,754,440 | 8/1973 | Edgerton et al. | 364/551 |
| 4,034,605 | 7/1977 | Green | 73/178 H |
| 4,402,054 | 8/1983 | Osborne et al. | 364/551 |

OTHER PUBLICATIONS

European Patent Search Report No. 95,994 published Dec. 7, 1983, Based on Application No. 83630086.

Primary Examiner—Jerry Smith
Assistant Examiner—Clark A. Jablon
Attorney, Agent, or Firm—M. P. Williams; Francis J. Maguire, Jr.

[57] ABSTRACT

The power required for a helicopter to hover is generated (14, 82) as the ratio of current operating power in forward flight (12, 77) determined (10, 73) from data relating operating power in forward flight to power required for hover for the aircraft. The power required to hover is compared (18, 83) with the maximum power available developed (16, FIG. 2; FIG. 3) by an engine model algorithm utilizing actual engine parameters. The comparison of maximum power to power required for hover is utilized to provide an indication (22) to the pilot. The viability of the indication is indicated by a "ready" indication (26).

3 Claims, 4 Drawing Sheets

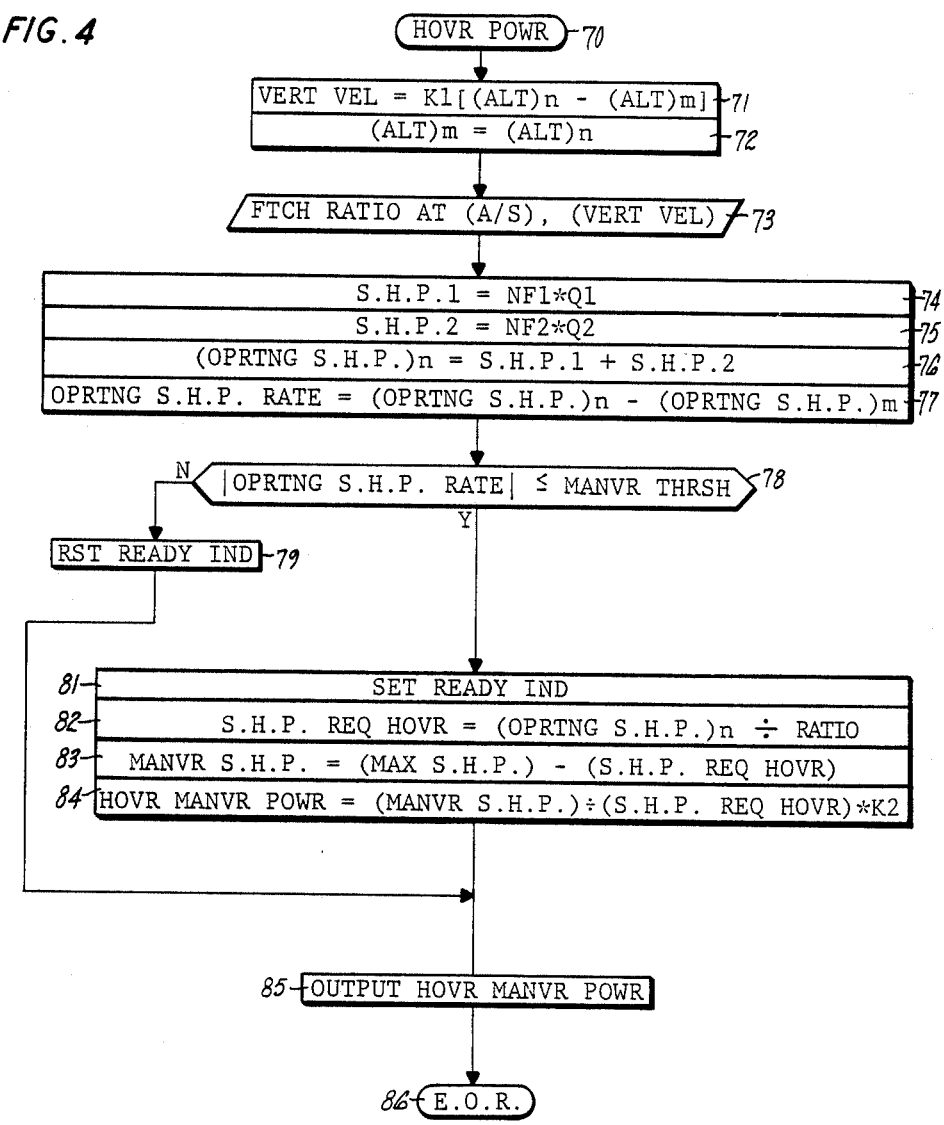

HELICOPTER POWER AVAILABLE TO HOVER INDICATOR

The Government has rights in this invention pursuant to Contract No. DAAK51-80-C-0038 awarded by the Department of the Army.

This is a continuation of application Ser. No. 382,257, filed on May 26, 1982, now abandoned.

DESCRIPTION

1. Technical Field

This invention relates to helicopters, and more particularly for automatically providing, during forward flight, an indication of the engine power currently available compared to the power which would be required to hover under current aircraft, engine and environment conditions.

2. Background Art

Heretofore, instruments that provide an indication to a helicopter pilot of a comparison of the power currently available and that which would be required under current weight and atmospheric conditions in order to hover, thereby providing an indication of the safety and maneuverability of a hover, or the power available for a run-on landing, have not been adequate in many respects. Such prior hover indicators depend on either the pilot providing an input of the total gross weight at takeoff, or a wheel weight transducer providing an input thereof. The weight has been used together with fixed schedules of aircraft and engine design parameters to approximate both the power required to hover under the then current weight and the power which should be available to accommodate the hover together with any maneuvering during hover. Such open loop calculations do not account for changing atmospheric conditions, deteriorated or failed engines, or deterioration of the rotor systems.

The consequences of the pilot attempting flare or hover maneuvers with insufficient power can be disastrous. An example is flying bags of water to a tank atop a mountain. The air density may be low due to the altitude of the mountain, and in certain cases the temperature may nonetheless be high, further reducing density and curtailing engine power. As is well known, the power required to hover and the power required for maximum speed are both maximal, whereas the power to cruise at "bucket speed" (on the order of 60 knots or so) is minimal. Thus the pilot may have no difficulty, even at a relatively high climb rate, when climbing at a forward speed which is the "best speed for climbing" (which is usually very near to the bucket speed). Yet, when attempting to hover in order to permit unloading the water, the helicopter may drop sharply, or even crash.

Another example is a sharp descent toward a forest fire near the end of which the water is to be released to aid in quenching the fire, followed by a sharp flare so that the helicopter will avoid the effects of the fire. If insufficient power is available (which may well be the case in the very hot air above a fire), the helicopter may simply fly right into the fire (particularly if the water load is not completely released before the flare).

DISCOLSURE OF INVENTION

Objects of the invention include automatic calculations of the power required to hover and the maximum power available to satisfy that requirement, which take into account deterioration of the rotor system and/or deterioration and/or failure of the engines, as well as current atmospheric conditions and aircraft weight.

According to the present invention, engine parameters are utilized to calculate the current operating power during forward flight, with or without climb, and the power required to hover is determined from the relationship between power required for forward flight at various airspeeds and power required to hover; maximum current available power is calculated from engine parameters by means of an engine model algorithm, and the relationship therebetween is expressed on a pilot indicator. In further accord with the invention, the pilot indicator is updated and indicated as being ready (reliable) only during relatively steady operating conditions. In still further accord with the present invention, the power required to hover is determined from a relationship of required hover power and airspeed at various speeds together with rate of climb. According to the invention further, the indication is expressed as the difference being available and required power, normalized to required power.

The present invention, by utilizing a known relationship between hover power and power required for forward flight at various speeds, as well as modifications thereto as a function of climb rate, to generate current hover power requirements from current actual power being used, provides a hover power requirement indication which is indicative of both deteriorated or partially failed rotor systems and current atmospheric conditions and weight. For instance, if icing of the rotor blades had occurred, more power would be required in forward flight and a commensurate amount of additional power would be required to hover. Thus, determining hover power from actual power in forward flight will take such into account. Similarly, variations in atmospheric conditions and weight which affect the amount of power which must be provided to the rotor in order to sustain forward flight will be taken into account automatically by ratioing the power for forward flight to the power required to hover. Similarly, by utilizing current engine conditions to generate the maximum shaft horsepower available from the engine, engine deterioration and even total failure will be indicated automatically. Thus, in a multi-engine helicopter, should one engine fail entirely, the engine model calculations utilizing parameters of that engine would indicate no power available therefrom. Or, if the engine were severely deteriorated, the engine parameters being fed to the model would provide a model output indicative thereof. And, even the power which the engine can generate under current atmospheric conditions is also provided by the model. Thus, all contingencies are met, the only error being in the accuracy of the ratio of hover power to actual power and the accuracy of the maximum available power model which is used. These can be limited to a very small amount, particularly if worst case conditions are accounted for.

The present invention may be implemented in analog, digital, or programmed computer technology, utilizing apparatus and techniques which are readily available to the art, in the light of the specific teachings relating thereto which follow hereinafter. However, the invention is described as it may be utilized in an aircraft having a computer, such as in a digital fuel control or in an automatic flight control system, additional programs of which can facilitate implementation of the invention.

Other objects, features and advantages of the present invention will become more apparent in the light of the following detailed description of exemplary embodiments thereof, as illustrated in the accompanying drawings.

BRIEF DESCRIPTION OF DRAWINGS

FIG. 4 is a simplified logic flow diagram illustative of a computer routine for providing an indication of the power required to hover in accordance with the invention.

BEST MODE FOR CARRYING OUT THE INVENTION

Figure 1:
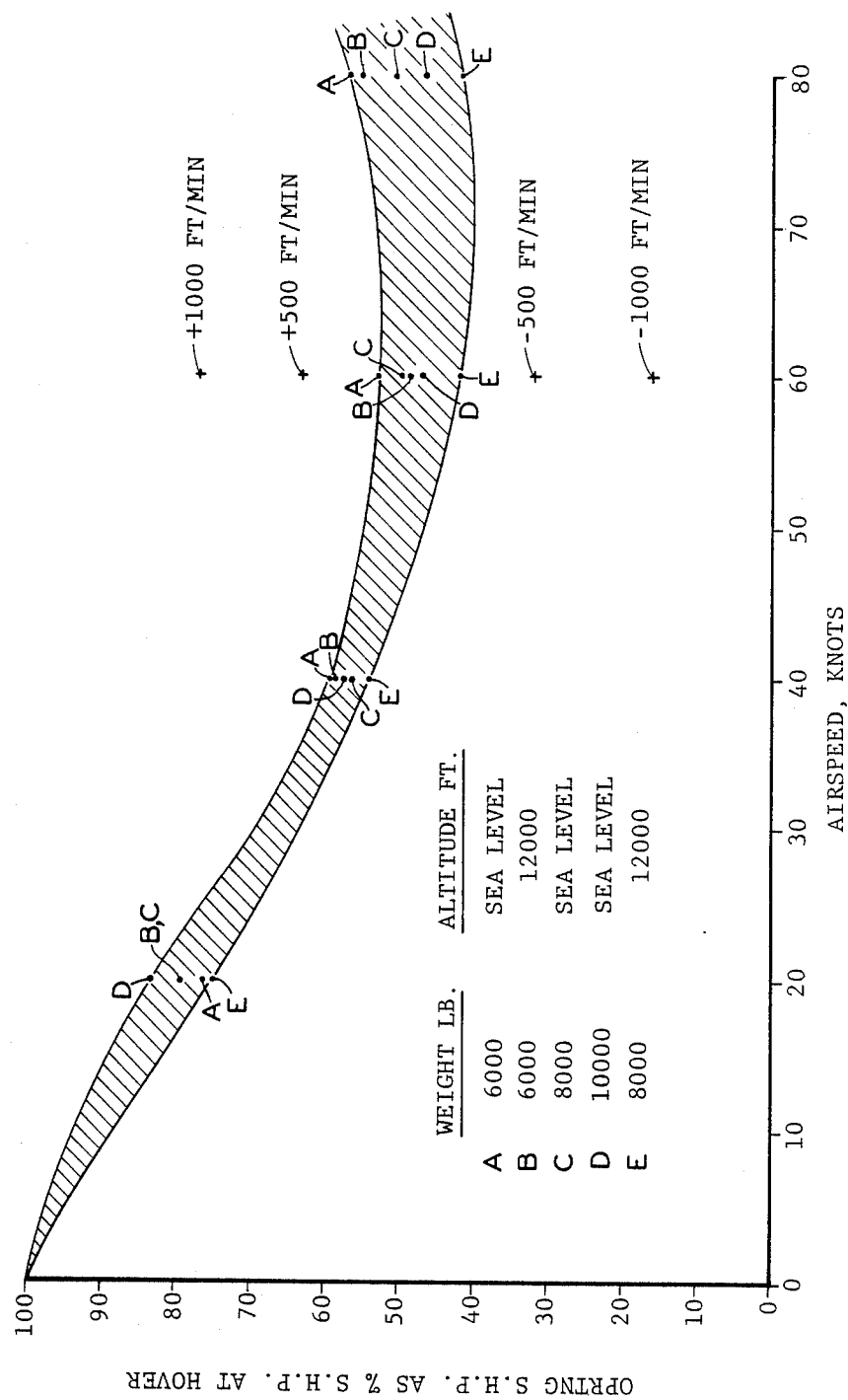
FIG. 1 is a chart illustrating a compressed curve of the power required for forward flight as a function of airspeed expressed as a percent of the power required to hover, with points indicative of changes therein resulting from vertical velocity (ascent and descent) during forward flight.

Referring now to FIG. 1, the power required for level forward flight of a helicopter at various airspeeds is expressed as a percent of the power required to hover, for a variety of helicopter weights and altitudes. The curve of FIG. 1 represents, at various airspeeds, the ratio of forward flight power required at such speed to the power required to hover. In a given helicopter wherein the gross weight may vary between 6,000 and 10,000 lbs., and designed for operation between sea level and 12,000 ft., the maximum deviation among weight and altitude is somewhat less than 10% of the power required to hover. In addition, several vertical velocity points are shown at 60 knots, deemed in this example to be the best speed for climb, which may also be quite close to the minimum power forward flight speed of the helicopter. These points indicate how the ratio of forward flight power to hover power changes at 60 knots for climb rates of 500 and 1,000 ft., per minute and descents of −500 and −1,000 ft. per minute.

The gist of the present invention is that a schedule, generally indicated by the curve of FIG. 1, can be established for various airspeeds (with or without vertical velocity) which will indicate, during forward flight at reasonable airspeeds (such as up to 80 knots or so), the ratio of actual, current operating power to power which would be required to hover under the same rotor, engine and atmospheric conditions. Thus, if the aircraft currently had a gross weight of 6,000 lbs. and was flying at 12,000 ft. (condition B in FIG. 1), at 60 knots in level flight, current operating power is 50% of power required to hover under the same rotor, engine, and atmospheric conditions. Thus, the power required to hover can be determined in such case simply by dividing by one-half (doubling) the operating power actually required. But as that same aircraft descends toward sea level (condition A in FIG. 1), the forward level flight power increases to nearly 60% of the power required to hover, so that the hover power could be determined by actual current flight power divided by about six-tenths.

Figure 2:
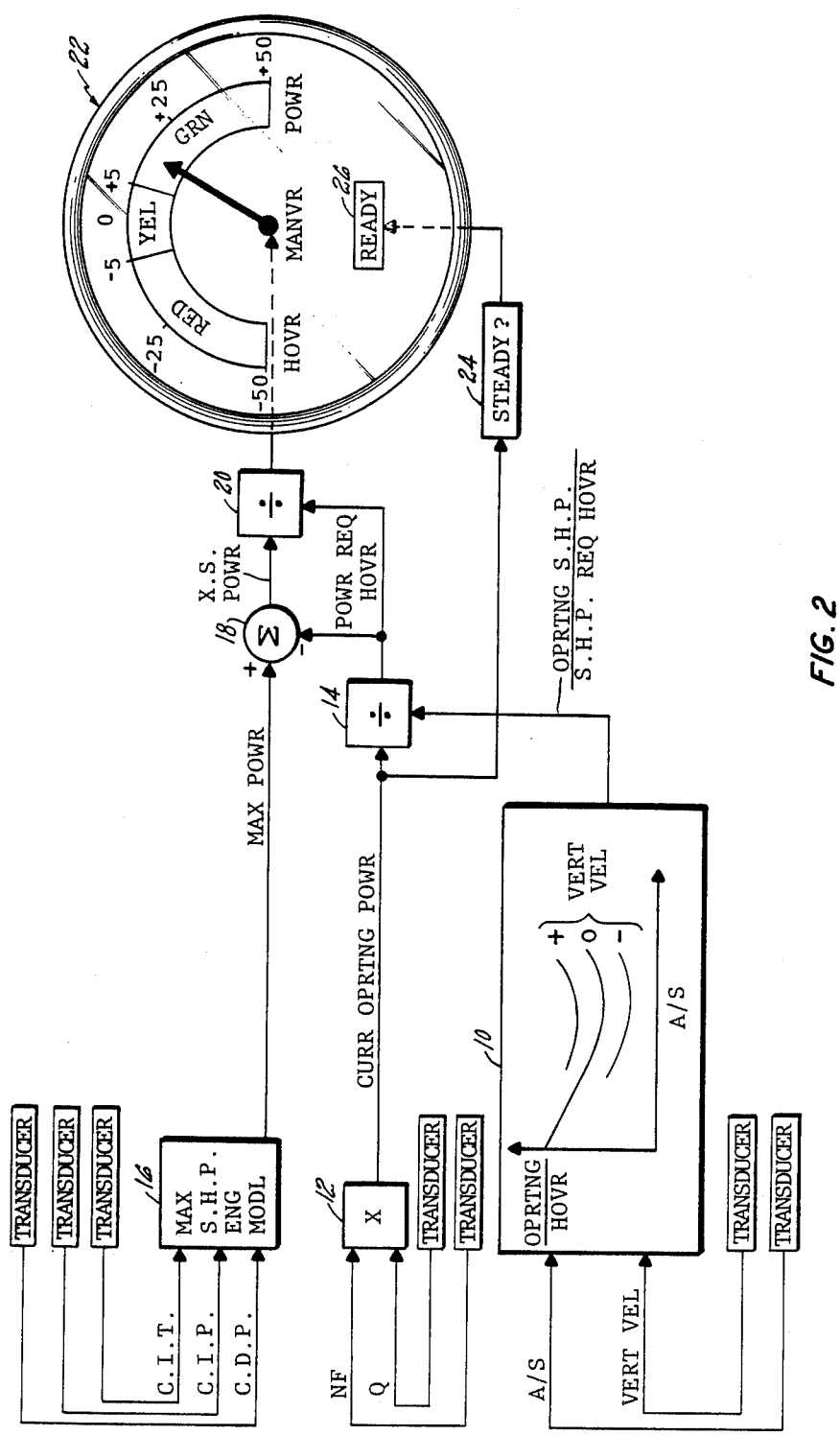
FIG. 2 is a simplified schematic block diagram illustrating the basic principles of the present invention.

The foregoing is illustrated more fully in FIG. 2. Therein, a schedule 10 (which may be a lookup table) is indicated as including a plurality of curves similar to the compressed curve illustrated in FIG. 1. For each vertical velocity (either ascent, descent or level flight), a compressed curve similar to that of FIG. 1 would be applicable. To be safe, the worst-case condition should be selected, which is the data points at the bottom of the compressed curve in FIG. 1 for use in the schedule 10. For instance, the schedule 10, for zero rate of climb (level flight), may use a curve which includes the data points of condition E, which indicate current power as being the lowest fraction of power required to hover, thereby safely indicating the maximum hover power which may be required (without taking into account the conditions differing between A–E). Thus, at level flight in 60 knots, if condition B obtained, and the power required to hover were twice that currently being used, utilization of the lowest data point of FIG. 1 (condition E) would cause the current power required to be divided by essentially 0.4 rather than 0.5 and thus yield an indication of a higher power requirement for hover, thereby being safe. Such individual curves, represented as data points for a large number of airspeeds (only a few being shown in FIG. 1) and a suitable number of vertical velocities (only a few shown being at 60 knots in FIG. 1) would make a suitable lookup table to represent the schedule 10 of FIG. 2.

Figure 3:
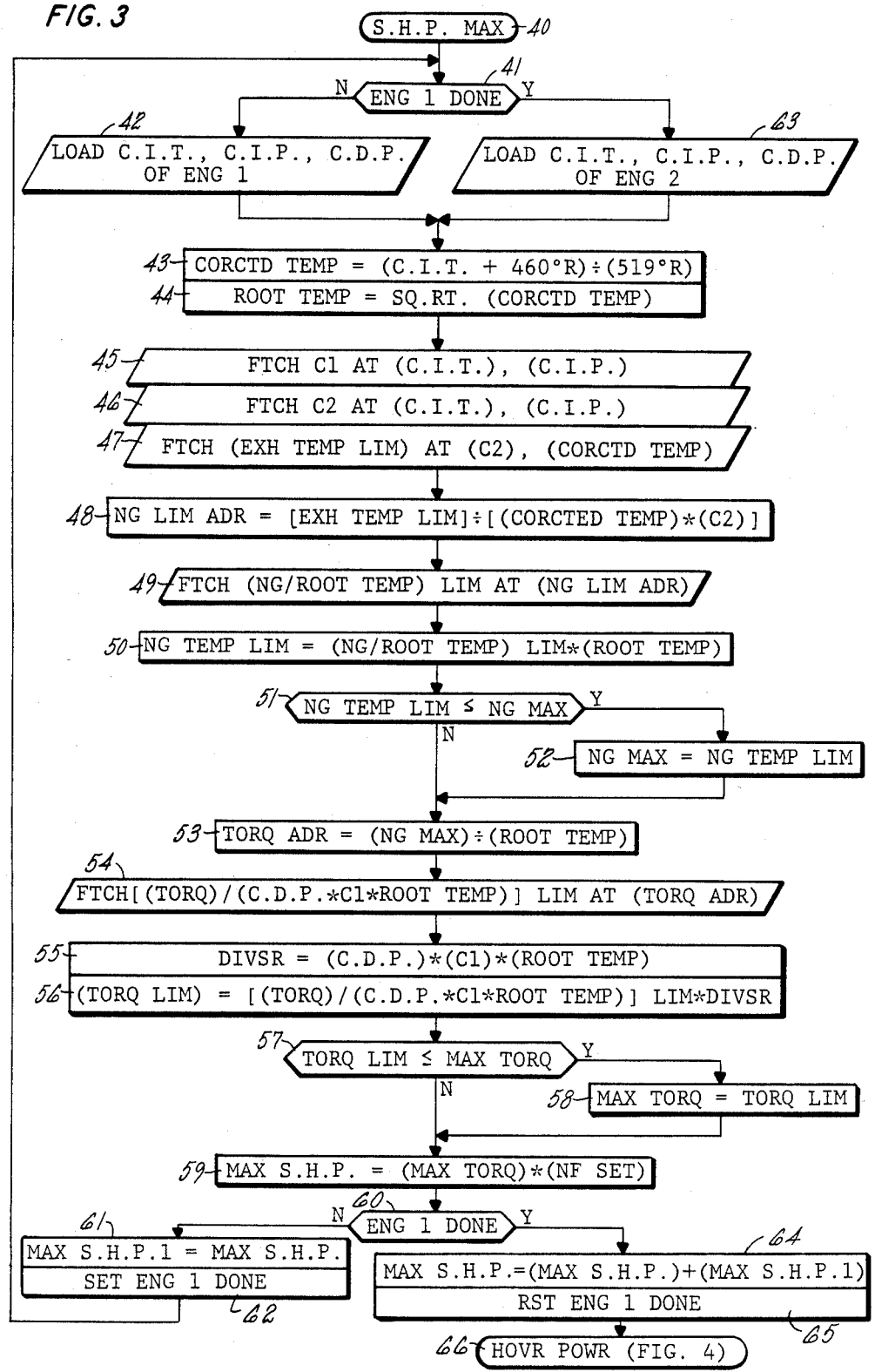
FIG. 3 is a simplified logic flow diagram of a computer routine for determining maximum available shaft horsepower in accordance with one type of engine model algorithm.

The schedule 10 is accessed by airspeed and vertical velocity inputs, and the output is a ratio of current operating power to power required to hover. A block 12 is indicative of determining current operating power simply by multiplying the engine free turbine speed (NF) by engine torque (Q). Dividing the current operating power, as at 14, by the ratio determined from the schedule 10, provides an indication of the power required to hover under the current rotor, engine and atmospheric conditions. An engine model, indicated by block 16, is capable of providing a reasonably accurate indication of the maximum shaft horsepower currently available from the power plant, which may include one or several engines, as a function of compressor inlet temperature, compressor inlet pressure and compressor discharge pressure. This provides a maximum power available signal. In the general case, these two signals give the pilot the indication he needs in order to determine the capability to hover and perhaps even to maneuver at hover. Similarly, the capability to maneuver at hover is indicative of the capability of performing a safe flare, to terminate a sharp descent. However, a better indication to the pilot is one which tells him what the circumstance will be at hover. For that reason, the power required to hover is subtracted from the maximum power available, as at 18, to provide a signal indicative of the excess power (or defficiency, depending upon whether maximum power exceeds the required hover power or not) which is then normalized to the power required to hover, by division as at 20, to provide an indication of helicopter maneuvering capability in terms of the power required to hover. This puts the indication to the pilot in a manner related to the capability to maintain flight without forward speed, thereby to assist in assessing the severity of maneuvers which may be undertaken, or, if a negative excess power condition exists, the relative difficulty of making a run-on landing. The indicator is illustated as having red, yellow and green zones to assist the pilot in assessing his situation, as well as providing indications of positive and negative excess maximum power compared with that required to hover under current conditions. In addition, a block 24 illustrates the desirability of providing a ready indication 26 on the indicator 22 whenever current operating conditions are relatively steady, since the indication of the present invention may be inaccurate during maneuvering or other perturbations in flight conditions. An exemplary implementation of the invention is described hereinafter as it may be embodied in a suitably programmed computer, such as in a digital fuel control or a digital automatic flight control system employing a computer. In such a computer, only two computer routines need be added as illustrated in FIGS. 3 and 4, the remaining routines (for fuel control or automatic flight control) and the routines utilized to initialize the system, acquire and output data, and the like, are all conventional, well within the skill of the art, and irrelevant to the invention. Thus, these are not described herein.

Referring to FIG. 3, a computer routine for calculating the maximum available shaft horsepower under current engine and atmospheric conditions is reached through an entry point 40 and a first test 41 determines if the calculation has been made for engine 1 or not. Initially, the first engine calculation has not been done and a negative result of test 41 will reach a subroutine 42 for loading parameters relating to engine 1 into the working registers for the routine. The parameters utilized in the engine model of the present embodiment include compressor inlet temperature (C.I.T.), compressor inlet pressure (C.I.P.) and compressor discharge pressure (C.D.P). Then a step 43 calculates a corrected temperature (sometimes referred to as "theta") by adding 460° Rankine to the compressor inlet temperature and dividing the sum by 519° Rankine. Next, a term (frequently referred to as "theta root"), referred to herein as "root temperature", is calculated in step 44 as the square root of the corrected temperature. Then a subroutine 45 fetches a first constant, C1, from a lookup table identified by a base address component (not shown) and the current compressor inlet temperature and compressor inlet pressure. And a subroutine 46 similarly fetches a constant, C2, from a lookup table located by a base address component (not shown) and the current compressor inlet temperature and compressor inlet pressure. The composite of compressor inlet temperature and pressure specify the data point to be reached in the lookup tables. Of course, if desired, the data points themselves may be expressed in terms of base amounts and slopes of interpolation, or may simply contain sufficient points for the desired accuracy without interpolation.

Next, a subroutine 47 fetches an exhaust temperature limit (sometimes referred to as T5 LIM) from a lookup table specified (in addition to a base address, not illustrated) by a composite address which includes C2 and the corrected temperature. Then, a step 48 calculates a gas generator speed limit address (an address used in addition to a base look-up table address therefor) as the exhaust temperature limit reached by the subroutine 47 divided by both the corrected temperature and C2. This is because the next parameter to be fetched, the ratio of gas generator speed to root temperature, is related to the ratio of exhaust temperature to the product of corrected temperature and C2. Then the subroutine 49 fetches the ratio of gas generator speed to root temperature at the address formulated in step 48. The fact that step 49 is fetching a limiting value of gas generator speed as a function of root temperature is simply because the value of the ratio which is fetched is one reached by an address formulated from the limiting exhaust temperature fetched in step 47. Step 50 multiplies the ratio of gas generator speed to root temperature, fetched in subroutine 49, by root temperature so as to provide a temperature limited gas generator speed. That is to say, this is a limiting speed of the gas generator dictated by temperature considerations under current inlet temperature and pressure conditions. Then a test 51 determines if the temperature limited gas generator speed is less than the design maximum gas generator speed. If it is not, then a step 52 will set the maximum gas generator speed to the lower, temperature limited gas generator speed. But if the temperature limitation exceeds the mechanical design limitation, step 52 is bypassed so that the maximum design gas generator speed will be used in the further calculations of the engine model.

In FIG. 3, a step 53 formulates a torque address by dividing the maximum gas generator speed by root temperature. Then, a lookup table (identified by the base address, not shown) containing a ratio of torque to the product of compressor discharge pressure, a constant (C1), and root temperature, as a function of gas generator speed, is accessed utilizing the torque address (maximum gas generator speed) determined in steps and tests 43–53. Then a step 55 formulates a divisor of the factor accessed by the subroutine 54, to be used in a step 56 which multiplies the torque ratio accessed in subroutine 54 by the divisor so as to provide a torque limit determined by a maximum gas generator speed, which in turn was determined as either the mechanical, design maximum gas generator speed or a temperature limited gas generator speed. Then a test 57 determines if the torque limit is less than the design maximum torque for the engine, and if it is, maximum torque is set equal to the torque limit. But if it is not less than maximum design torque, then step 58 is bypassed so that maximum design torque is used instead, during the remaining calculations of the model. Then in a step 59 the maximum shaft horsepower is calculated as the product of maximum torque times the current reference speed (NF SET) of the engine's free turbine.

In FIG. 3, following calculation of maximum shaft horsepower for the first engine, a test 60 determines if the first engine calculation is completed or not. In the first pass through the bulk of FIG. 3, test 60 will be negative reaching a step 61 which saves the calculated value of maximum shaft horsepower for the first engine followed by a step 62 which sets the engine 1 done discrete. Then the routine reverts back to test 41 which now will be affirmative, so that a subroutine 63 will load the working registers for the routine of FIG. 3 with the compressor inlet temperature, compressor inlet pressure and compressor discharge pressure of engine 2. Then, all of the tests and steps 43–59 are repeated utilizing the temperature and pressures of engine 2. Note that it is assumed that both engines have the same design parameters and can therefore utilize the same lookup tables, schedules and constants. Otherwise, suitable modifications to the routine should be made.

When maximum shaft horsepower has been generated for engine 2 in step 59, test 60 is again reached and this time is affirmative, reaching a step 64 which provides maximum shaft horsepower as a summation of that just generated for the second engine with maximum shaft horsepower for the first engine which was saved in step 61. This provides a value of maximum shaft horsepower available from the power plant, which includes that for both engines in the exemplary embodiment. Then, a step 65 resets the engine 1 done discrete so that the next pass through the routine of FIG. 3 will begin with engine 1, due to a negative result of test 41. And then the routine is exited and the hover power routine of FIG. 4 is reached through a transfer point 66.

Because the subroutine of FIG. 3 independently generates current maximum shaft horsepower for each engine, using actual engine parameters, the accuracy of the calculation is limited only by the validity of the model. Since this is within a few percent of rated power, it is not only quite adequate, but far superior to the use of design rated power indications, as in the prior art.

In FIG. 4, the hover power routine is reached through an entry point 70 and a first step 71 determines the vertical velocity by subtracting the aircraft altitude for a next preceding cycle (designated by "m") from the altitude determined in the current cycle (designated by "n"), and multiplying the difference by a constant, K1, which takes into account the cycle time of the routine of FIG. 4. Then the altitude is updated for use in the next cycle in a step 72. Next, a subroutine 73 fetches the ratio of power for forward flight to power required for hover from a lookup table (10, FIG. 2) at a base address (not shown) to reach data points specified by address components including airspeed and vertical velocity. Then, the current actual operating shaft horsepower for the power plant is calculated in steps 74-76. In steps 74 and 75 the shaft horsepower for each engine is calculated as the product of the engine's free turbine speed times the engine output torque. In step 76, the operating shaft horsepower for the current cycle is generated as a summation of the calculated shaft horsepower for both engines. In step 77, a rate of change operating shaft horsepower is generated by subtracting the operating shaft horsepower calculated in the preceding cycle from the operating shaft horsepower calculated in the present cycle. This rate is compared in a test 78 to determine if it is less than some maneuvering threshold, above which the generated data would be faulty. If the rate of change of operating shaft horsepower is not below a maneuvering threshold, this is indicative of a transient condition where it cannot be relied on to extrapolate to hover power required. Therefore, a negative result test 78 will reach a step 79 to reset the ready indicator (26, FIG. 2) and also bypass a series of steps which otherwise would calculate the hover maneuver power for application to the indicator 22, FIG. 2. However, when the operating shaft horsepower is not sufficiently steady, after the ready indicator is reset by step 79, the last, previously calculated value of hover maneuver power is set up for output to the indicator 22 by a step 85, before the program is ended, as at 86.

In the case where the operating shaft horsepower is relatively steady, an affirmative result of test 78 will reach step 81 which sets the ready indicator (26, FIG. 2). Then the shaft horsepower required to hover is calculated in step 82 by dividing the operating shaft horsepower of the current cycle by the ratio fetched from the lookup table (equivalent to 14, FIG. 1). Then the maneuvering shaft horsepower is calculated in step 83 as a difference between the maximum shaft horsepower calculated in the routine of FIG. 3 and the inferred shaft horsepower required to hover calculated in step 82. In step 84, the hover maneuvering power is normalized by dividing the maneuver shaft horspower by the shaft horsepower required to hover; in this step, the data word representing hover maneuver power may be scaled by a constant K2 which is related to the full scale deflection of the indicator 22, in the well known fashion.

Thus, the routine of FIG. 4 determines the vertical velocity, fetches the ratio of forward flight power to hover power from a lookup table in response to airspeed and rate climb, generates the operating shaft horsepower for each engine, determines if it is steady enough to be reliable, calculates the power required to hover from the ratio, determines the difference between maximum shaft horsepower and the power required to hover, and normalizes and scales it for application to the indicator.

The present invention has been disclosed as it may be implemented in routines of a computer, such as a computerized digital fuel control or a computerized digital automatic flight control system. The generation of maximum shaft horsepower has been illustrated in accordance with a particular, known engine model; however, other models or methods of generating a reasonably accurate and current value of maximum available power may be used in conjunction with the invention if desired, the particular method of determining maximum power is not relevant to the present invention so long as it does reflect current engine and atmospheric conditions to a suitable degree. If desired, the adaptive engine model disclosed in copending U.S. patent application Ser. No. 382,114, now U.S. Pat. No. 4,467,640, entitled "Gas Turbine Engine Power Availability Measurement" and filed contemporaneously herewith by Terry Morrison, which is incorporated herein by reference may be utilized to determine the maximum shaft horsepower. The engine torque indications utilizing step 76 may be taken from torque meters that normally provide torque information to the pilots to enable them to balance the two engines; but if the engines do not have torque meters, a torque model employing other engine parameters, such as turbine temperature drop, may be used if desired, provided it is sufficiently accurate to serve the desired use of the present invention.

The invention is disclosed as utilizing airspeed and vertical velocity to access ratios of power required for forward flight to hover power as described hereinbefore. But if desired, a more complex family of curves may include the effects of altitude which are illustrated in FIG. 1. This would provide relatively little improvement at speeds below 50 knots, and could provide 8% or 9% more accuracy at 60 knots and above, in some cases. And, other parameters, such as temperature, could be included, if desired, to improve accuracy or extend the speed at which the ratio is sufficiently accurate (e.g., within 10% or so).

On the other hand, a single curve could be utilized accessed only by airspeed if desired, provided that the ready light included an indication of minimal vertical velocity, such as by an additional test following test 78 in FIG. 4. However, this would preclude obtaining readings during flights up a mountain or during normal descents. Obviously, the ratio expressed in FIG. 1 could be reworked to the reciprocal thereof, expressing the power required to hover as a function of the power required for forward flight. Then the multiplication function would be utilized in place of the division function (14, FIG. 2; 82, FIG. 4). The invention is described in a helicopter having a two-engine power plant. Obviously, the invention is easily implemented for a helicopter utilizing one engine or more than two engines. Further, it should be understood that the indication to the pilot may simply be the positive excess or negative deficiency of maximum available power compared to power required to hover, or some other desired function. All of the foregoing is irrelevant to the invention; the significant thing is that a dynamic engine model utilizes current engine operating conditions to generate a maximum available power indication which reflects engine and atmospheric conditions, and that the power required to hover is developed from a ratio relating it to the actual current operating power, which takes into account weight, rotor condition, and atmospheric conditions.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. Apparatus for indicating power available for hovering a helicopter having a power plant including at least one engine, comprising:

transducer means for providing parameter signals, each parameter signal being indicative of a related current aircraft condition;

signal processing means, for providing in response to a first plurality of parameter signals, a ratio signal indicative of the relation between the power required during forward flight at the current airspeed and the power required to hover under the same rotor, engine, weight and atmospheric conditions, and for providing, in response to a second plurality a parameter signals, a current operating power signal indicative of current power being supplied by the engine to the aircraft, and for providing, in response to said current operating power signal and said ratio signal, a power required to hover signal indicative of the power required to execute a hover maneuver under the present rotor, engine, weight and atmospheric conditions, and for providing, in response to a third plurality of said parameter signals, a maximum power signal adaptively updated to be indicative, according to an adaptive engine model, of the maximum power which can currently be supplied under current engine and atmospheric conditions by the presently operating helicopter power plant, and for providing, in response to said power required to hover signal and said maximum power signal, a remaining power signal indicative of the power currently remianing which can be supplied by the power plant, and for providing, in response to said remaining power signal and to said power required to hover signal, a hover power signal indicative of the ratio between the remaining power signal and the power required to hover signal; and a power indicator, responsive to the hover power signal, for displaying the magnitude thereof.

2. The apparatus of claim 1, wherein the signal processor further comprises:

means for providing, in response to the current operating power signal, a rate of change signal indicative of the time rate of change of the current operating power signal, for generating a ready signal in response to the rate of change signal being below a predetermined threshold magnitude; and a ready indicator, responsive to the ready signal for providing an indication to the pilot that a displayed hover power signal is reliable.

3. The apparatus of claim 1, wherein the power indicator displays the hover power signal in an analog dial format.

* * * * *

UNITED STATES PATENT AND TRADEMARK OFFICE
CERTIFICATE OF CORRECTION

PATENT NO. : 4,736,331

DATED : April 5, 1988

INVENTOR(S) : Nicholas D. Lappos, Raymond D. Zagranski, James J. Howlett

It is certified that error appears in the above-identified patent and that said Letters Patent is hereby corrected as shown below:

On the title page

After "[73] Assignee:", delete "United Technologies Corporation, Hartford, Conn." and insert -- Colt Industries Inc, West Hartford, Conn. --

Column 3, line 20, delete "illustative" and insert -- illustrative --.

Column 6, line 5, delete "That" and insert -- This --.

Claim 1, column 9, line 34, delete "a parameter signals" and insert -- of parameter signals --.

Claim 1, column 10, line 15, delete "remianing" and insert -- remaining --.

Signed and Sealed this

Twenty-fifth Day of April, 1989

Attest:

DONALD J. QUIGG

Attesting Officer

Commissioner of Patents and Trademarks